(12) United States Patent
Benware et al.

(10) Patent No.: US 10,496,779 B2
(45) Date of Patent: *Dec. 3, 2019

(54) GENERATING ROOT CAUSE CANDIDATES FOR YIELD ANALYSIS

(71) Applicant: Mentor Graphics Corporation, Wilsonville, OR (US)

(72) Inventors: Robert Brady Benware, Clackamas, OR (US); Wu-Tung Cheng, Lake Oswego, OR (US); Christopher Schuermyer, Happy Valley, OR (US); Jonathan J. Muirhead, Tigard, OR (US); Chen-Yi Chang, Taichung (TW)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,014

(22) Filed: Sep. 12, 2016

(65) Prior Publication Data

US 2017/0103158 A1    Apr. 13, 2017

Related U.S. Application Data

(63) Continuation of application No. 13/973,998, filed on Aug. 22, 2013, now Pat. No. 9,443,051.

(60) Provisional application No. 61/691,930, filed on Aug. 22, 2012.

(51) Int. Cl.
    *G06F 17/50* (2006.01)

(52) U.S. Cl.
    CPC ...... *G06F 17/5081* (2013.01); *G06F 17/5068* (2013.01); *G06F 2217/12* (2013.01)

(58) Field of Classification Search
    CPC ............ G06F 17/5068; G06F 17/5081; G06F 2217/12
    See application file for complete search history.

(56) References Cited

U.S. PATENT DOCUMENTS

| 6,948,141 | B1 | 9/2005 | Satya et al. |
| 7,434,198 | B2 | 10/2008 | Strelkova et al. |
| 7,752,594 | B2 | 7/2010 | Takeda et al. |
| 8,037,428 | B2 | 10/2011 | Tong et al. |
| 8,607,169 | B2 | 12/2013 | Leu |
| 9,443,051 | B2 | 9/2016 | Benware et al. |
| 2008/0005704 | A1 | 1/2008 | Miloslavsky et al. |

(Continued)

OTHER PUBLICATIONS

Benware et al., "Determining a Failure Root Cause Distribution From a Population of Layout-Aware Scan Diagnosis Results," *IEEE Design and Test of Computers*, vol. 29, Issue 1, Feb. 2012, 11 pages.

(Continued)

*Primary Examiner* — Nha T Nguyen

(57) ABSTRACT

Aspects of the invention relate to yield analysis techniques for generating root cause candidates for yield analysis. With various implementations of the invention, points of interest are first identified in a layout design. Next, regions of interest are determined for the identified points of interest. Next, one or more properties are extracted from the regions of interest. Based at least on the one or more properties, diagnosis reports of failing devices fabricated according to the layout design are analyzed to identify probable root causes.

20 Claims, 7 Drawing Sheets

Flow chart 300

(56) References Cited

U.S. PATENT DOCUMENTS

| | | | | |
|---|---|---|---|---|
| 2009/0300561 | A1* | 12/2009 | Tong | G06F 17/5081 716/106 |
| 2010/0180239 | A1 | 7/2010 | Leu | |
| 2010/0185999 | A1 | 7/2010 | Graur et al. | |
| 2012/0216169 | A1* | 8/2012 | Park | G01N 21/95607 716/136 |
| 2013/0031522 | A1* | 1/2013 | Robles | G06F 17/5081 716/112 |
| 2013/0174102 | A1 | 7/2013 | Leu | |
| 2013/0195368 | A1* | 8/2013 | Fang | G06K 9/68 382/217 |
| 2013/0298094 | A1* | 11/2013 | Chen | G06F 17/5081 716/112 |

OTHER PUBLICATIONS

Chang et al., "Experiences with Layout-Aware Diagnosis—A Case Study," *Electronic Device Failure Analysis*, vol. 12, Issue 2, May 2010, pp. 12-28.

Mekkoth et al., "Yield Learning with Layout-aware Advanced Scan Diagnosis," *Conference Proceedings from the 32$^{nd}$ International Symposium for Testing and Failure Analysis (ISTFA)*, Nov. 2006, pp. 412-418.

Schuermyer et al., "Device Selection for Failure Analysis of Chain Fails Using Diagnosis Driven Yield Analysis," *Conference Proceedings from the 37$^{th}$ International Symposium for Testing and Failure Analysis (ISTFA)*, Nov. 2011, pp. 1-6.

Sharma et al., "Efficiently Performing Yield Enhancements by Identifying Dominant Physical Root Cause from Test Fail Data," *2008 IEEE International Test Conference*, Oct. 2008, pp. 1-9.

Tam et al., "Systematic defect identification through layout snippet clustering," *2010 IEEE International Test Conference*, Nov. 2010, pp. 1-10.

Tang et al., "Analyzing vol. Diagnosis Results with Statistical Learning for Yield Improvement," *12$^{th}$ IEEE European Test Symposium*, May 2007, pp. 145-150.

Yang et al., "Diagnosis-Driven Yield Analysis Improves Mature Yield," *Chip Design Magazine*, Fall 2011, 5 pages.

\* cited by examiner

Flow chart 300

| POI | MaxX Vertex Count | MaxY Vertex Count | MaxX Vertex Locat. | MaxY Vertex Locat. | X Perimeter | Y Perimeter | X Diff Sum | Y Diff Sum | XY Diff Sum |
|---|---|---|---|---|---|---|---|---|---|
| #1 | 2 | 2 | 3 | 4 | 824 | 36 | 17.555 | 18.565 | 19.355 |
| #2 | 6 | 2 | 1 | 2 | 300 | 54 | 8.5 | 96.53 | 17.55 |
| #3 | 3 | 4 | 5 | 9 | 824 | 34 | 16.6305 | 17.5561 | 16.6305 |
| #4 | 2 | 2 | 5 | 5 | 565 | 45 | 54.56 | 12.58 | 1247.5 |

FIG. 6

GENERATING ROOT CAUSE CANDIDATES FOR YIELD ANALYSIS

RELATED APPLICATIONS

This is a continuation of U.S. patent application Ser. No. 13/973,998, filed Aug. 22, 2013, which application claims the benefit of and priority to U.S. Provisional Patent Application No. 61/691,930, entitled "Automatic Hypothesis Generation," filed on Aug. 22, 2012, and naming Robert Brady Benware et al. as inventors, which applications are incorporated entirely herein by reference.

FIELD OF THE INVENTION

The present invention relates to the field of integrated circuit (IC) testing technology. Various implementations of the invention may be particularly useful for yield analysis for IC manufacturing.

BACKGROUND OF THE INVENTION

Achieving high and stable manufacture yields is important for integrated circuit products to meet quality, reliability and profitability objectives. Yields, however, tend to be significantly lower than acceptable when a new manufacturing process is introduced, or a new design is introduced to a mature manufacturing process. Yield learning or analysis can be employed to ramp up the initial low yield.

A critical goal in a yield analysis process is to identify root causes of the yield loss. Some yield analysis techniques extract root causes from volume scan diagnosis results. Based on design information, test patterns used to detect the failure, and failure data, scan diagnosis can identify specific locations in a design that are likely to explain the failure data. Scan diagnosis results, however, are usually not definite. The ambiguity is two-fold: First, the scan diagnosis often identifies multiple locations (referred to as suspects hereinafter) for the observed defective logical behavior; second, each suspect may be associated with multiple potential defect root causes.

Various methods have been employed to extract true or at least probable defect root cause(s) from "noisy" scan diagnosis reports. One method employs an iterative learning algorithm to derive feature failure probabilities. Here, a feature is a layout configuration in the design with unique characteristics such as side-to-side bridges on metal layer 3. A feature having a high feature failure probability could be a root cause of the yield loss. In this method, the feature failure probability for a feature is expressed by an equation that includes feature failure probabilities for all of the features. Starting with initial guesses, feature failure probabilities are calculated iteratively until converging to a solution. The derived feature failure probabilities show which features are likely to be yield limiters.

Another method called zonal analysis manages the diagnosis noise by dividing a wafer into a set of zones. For example, a zone map may include a center zone, a middle zone and an outer zone. If defects are of random nature, Pareto distribution for various features is expected to be similar across the zone map of failing wafers. If a feature has a higher occurrence in one zone than in the rest, that feature may be treated as the root cause.

More recently, a new method, referred to as root cause deconvolution, is developed based on the Bayesian probability analysis. The method uses the Bayesian model to formulate the probability of observing a set of diagnosis results for a given feature failure distribution. An expectation-maximization process is performed to derive the most likely feature failure distribution.

No matter which of the above methods is used, the knowledge of features that are potential root causes is required. Potential root causes may be derived, for example, based on available design-for-manufacture (DFM) rules or heuristics. This may not be sufficient however, because a new manufacturing process or a new design may suffer yield losses caused by previously-unknown root causes. It is thus desirable to search for new methods for identifying potential root causes.

BRIEF SUMMARY OF THE INVENTION

Aspects of the invention relate to yield analysis techniques for generating root cause candidates for yield analysis. With various implementations of the invention, points of interest are first identified in a layout design. Points of interest represent locations of potential critical features. A critical feature is a layout feature that is difficult to manufacture. Points of interest may be identified by searching for disruptions in the layout design. Next, regions of interest are determined for the identified points of interest. A region of interest is a region surrounding a point of interest. The shape and size of a region of interest may be determined according to predetermined values or rules. Next, one or more properties are extracted from the regions of interest. The one or more properties may comprise a pattern identifier obtained with a hash function. The one or more properties may also comprise properties representing some pattern characteristics of a region of interest. Based at least on the one or more properties, diagnosis reports of failing devices fabricated according to the layout design are analyzed to identify probable root causes. In this process, root cause candidates may be generated based at least on the extracted one or more properties. The analysis then uses the generated root cause candidates to identify probable root causes.

BRIEF DESCRIPTION OF THE DRAWINGS

FIG. 6 illustrates a table that includes values of nine properties extracted from four regions of interest.

DETAILED DESCRIPTION OF THE INVENTION

General Considerations

Various aspects of the present invention relate to yield analysis techniques and more specifically techniques for generating root cause candidates. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine," "identify," and "extract" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

Figure 1:
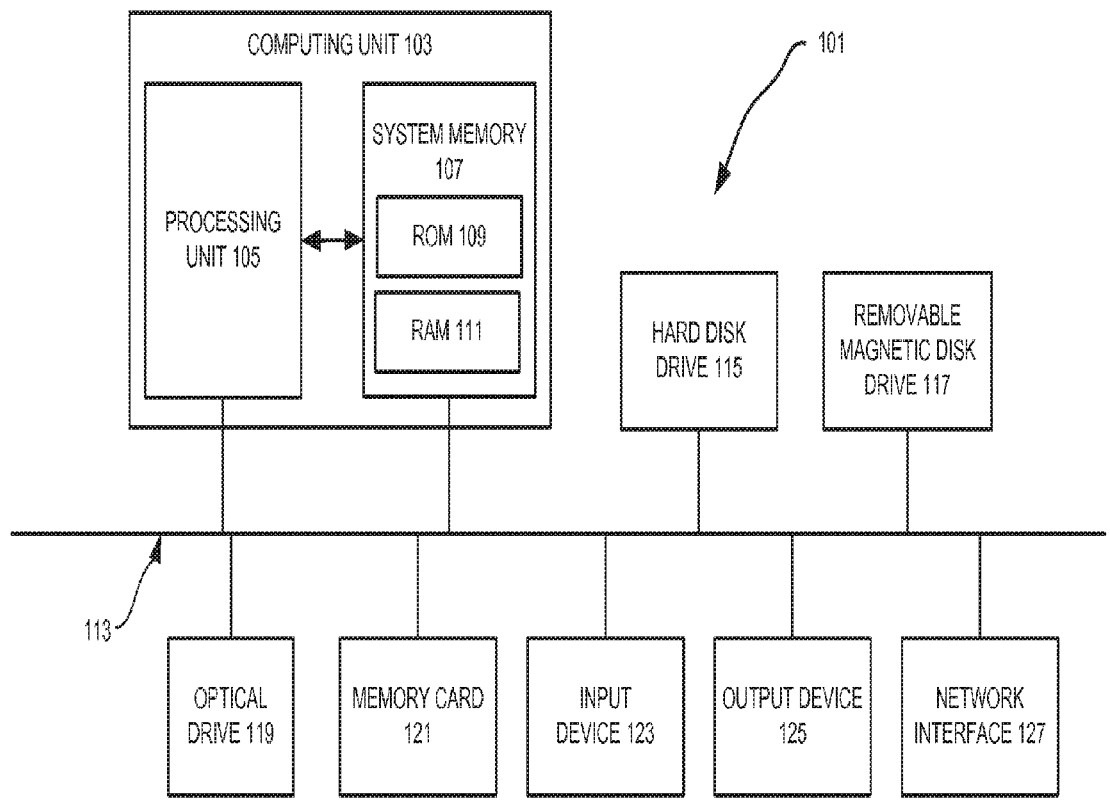
FIG. 1 illustrates a programmable computer system with which various embodiments of the invention may be employed.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Yield Analysis Tools and Methods

Figure 2:
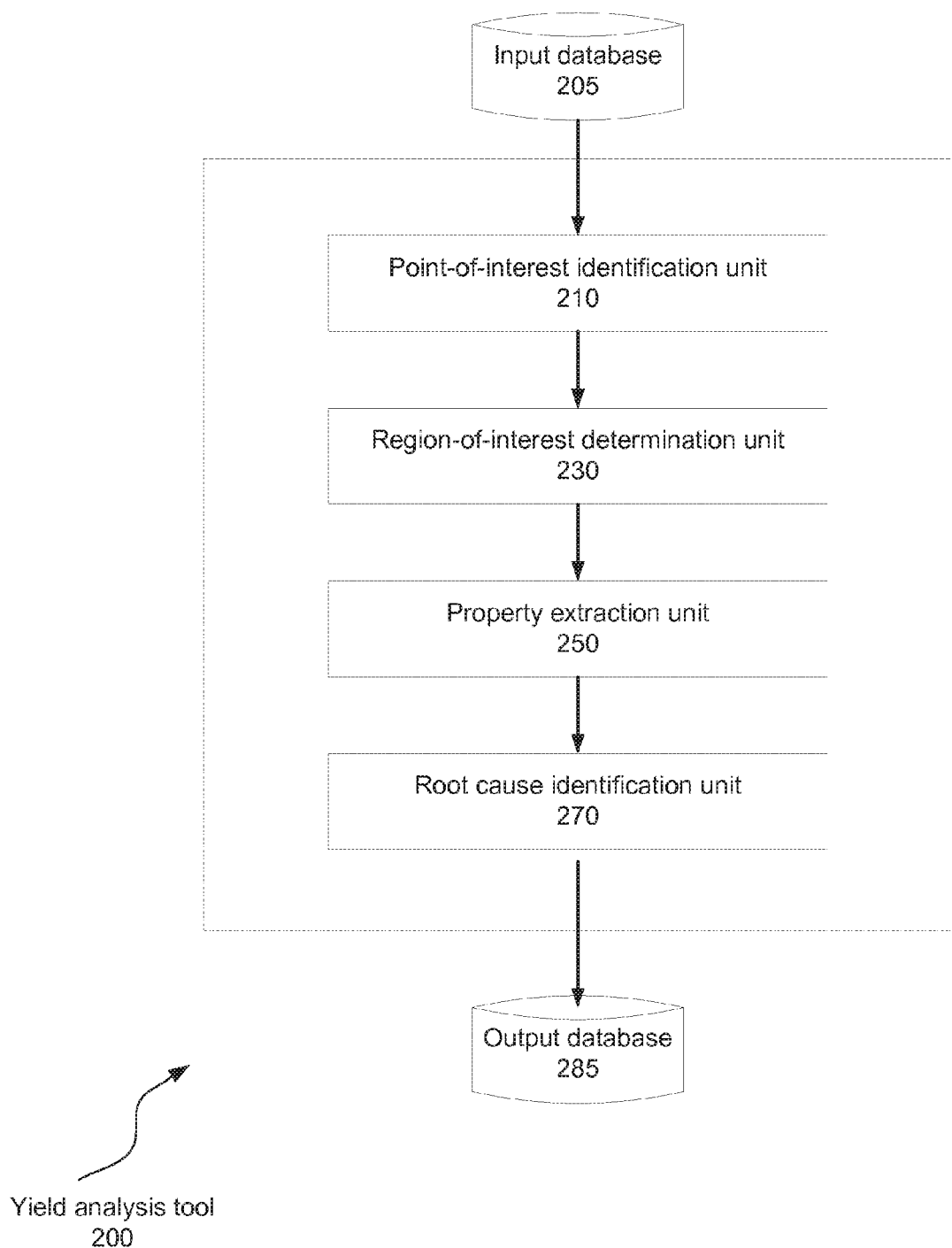
FIG. 2 illustrates an example of a yield analysis tool according to various embodiments of the invention.

FIG. 2 illustrates an example of a yield analysis tool according to various embodiments of the invention. As seen in the figure, the yield tool 200 includes four units: a point-of-interest identification unit 210, a region-of-interest determination unit 230, a property extraction unit 250, and a root cause identification unit 270. As will be discussed in more detail below, some implementations of the yield analysis tool 200 may cooperate with (or incorporate) one or both of an input database 205 and an output database 285. While the input database 205 and the output database 285 are shown as separate units in FIG. 2, a single data storage medium may be used to implement some or all of these databases.

According to some embodiments of the invention, one or more of the point-of-interest identification unit 210, the region-of-interest determination unit 230, the property extraction unit 250, and the root cause identification unit 270 may be implemented by executing programming instructions on one or more programmable computers/computer systems, such as the computing system illustrated in FIG. 1. Correspondingly, some other embodiments of the invention may be implemented by software instructions, stored on a non-transitory computer-readable medium, for instructing one or more programmable computers/computer systems to perform the functions of one or more of the point-of-interest identification unit 210, the region-of-interest determination unit 230, the property extraction unit 250, and the root cause identification unit 270. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

Figure 3:
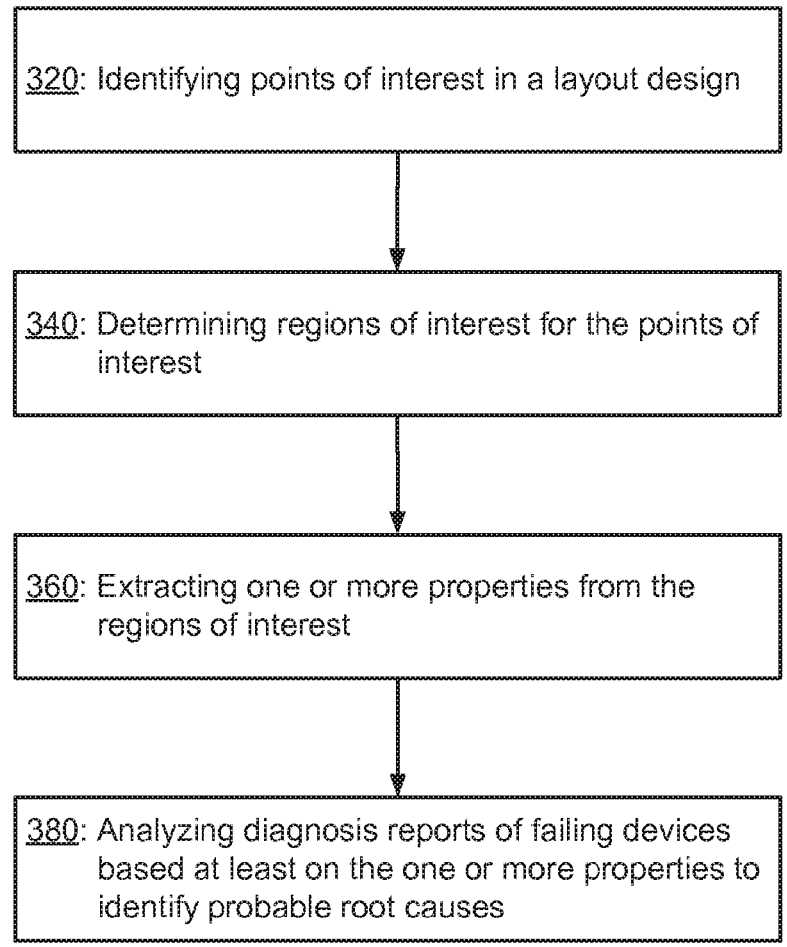
FIG. 3 illustrates a flowchart describing yield analysis methods that may be employed by various embodiments of the invention.
Figure 3:

For ease of understanding, yield analysis methods that may be employed according to various embodiments of the invention will be described with reference to the yield analysis tool 200 illustrated in FIG. 2 and the flow chart 300 in FIG. 3. It should be appreciated, however, that alternate implementations of a yield analysis tool may be used to perform the yield analysis method shown in the flow chart 300 according to various embodiments of the invention. In addition, it should be appreciated that implementations of the yield analysis tool 200 may be employed with other yield analysis methods according to different embodiments of the invention.

Figure 4A:
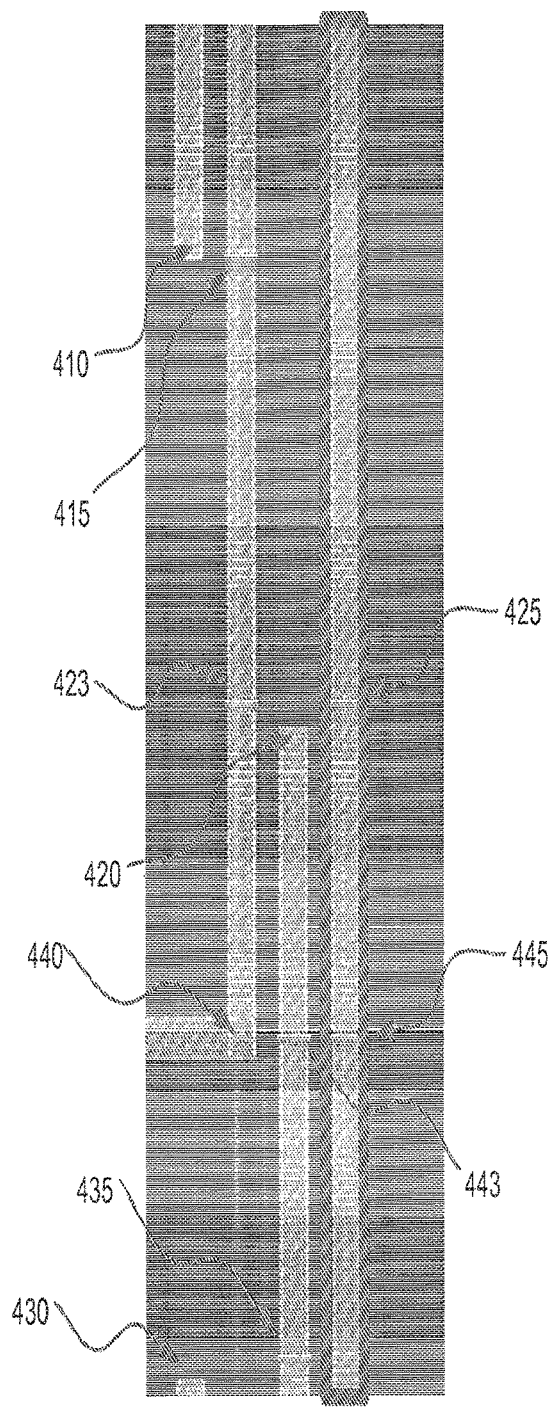
FIG. 4*a* illustrates an example of points of interest located by searching for disruption/discontinuity locations.

Initially, in operation 320, the point-of-interest identification unit 210 identifies points of interest in a layout design. The layout design may be a whole design, parts of a design, or just regions associated with defect suspects listed in a diagnosis report. Points of interest represent locations of potential critical features. A critical feature is a layout feature that is difficult to manufacture. The presence of line ends and corners, for example, can cause manufacture problems to neighboring line features. Line ends and corners can be located by searching for disruption/discontinuity locations in the layout design. Accordingly, the point-of-interest identification unit 210 may identify points of interest by searching for disruptions in the layout design. FIG. 4a illustrates an example of points of interest located by searching for disruptions. In the figure, points of interest 415, 423-425, and 435 are located near the disruptions—line ends 410, 420 and 430, respectively while points of interest 443-445 are found near the disruption—corner 440. In some embodiments of the invention, disruptions themselves may be treated as points of interest.

Additionally or alternatively, DFM rules, lithographic simulation, and/or heuristics may be employed to establish criteria for locating points of interest. Pattern matching may also be employed to locate points of interest. Once a point of interest is identified, the point-of-interest identification unit 210 may place a marker at the location in the layout design for subsequent analysis.

Figure 4B:
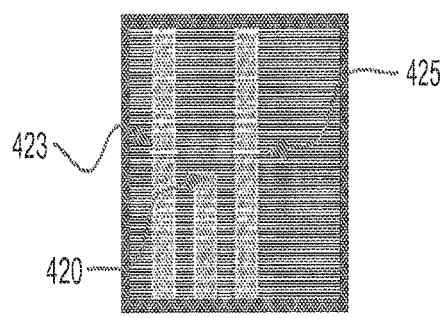
FIG. 4*b* illustrates an example of a rectangle region of interest determined for a point of interest in FIG. 4*a*.

Next, in operation 340, the region-of-interest determination unit 230 determines regions of interest for the identified points of interest. A region of interest is a region surrounding a point of interest. The shape and size of a region of interest may be determined according to predetermined values or rules. Rectangle, often used by physical verification tools, can be a default choice for the region-of-interest determination unit 230. FIG. 4b illustrates an example of a rectangle region of interest. In the figure, the region of interest centers at the point of interest of 425. The point of interest 423 is also included. With some implementations of the invention, the region-of-interest determination unit 230 determines one region of interest for each point of interest. As such, there will be another region of interest centered at the point of interest 423. If two points of interest are near each other within a threshold distance, the region-of-interest determination unit 230 may treat them as one point of interest.

Next, in operation 360, the property extraction unit 250 extracts one or more properties from the regions of interest. The one or more properties may comprise a pattern identifier obtained with a hash function. The property extraction unit 250 may generate pattern identifiers through other approaches. Alternatively or additionally, the one or more properties may comprise properties representing some pattern characteristics of a region of interest.

Figure 5A:
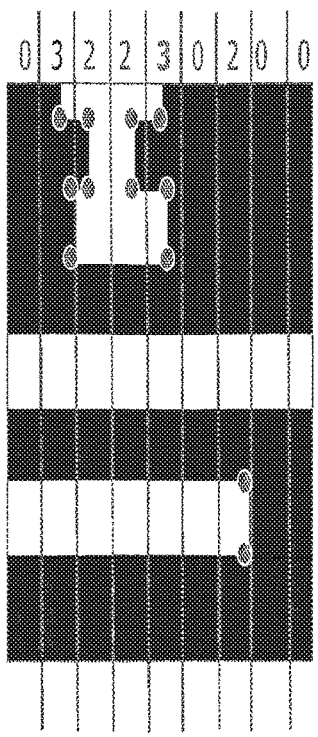
FIG. 5*a* illustrates an example of extracting maximal X vertex count as a property.
Figure 5B:
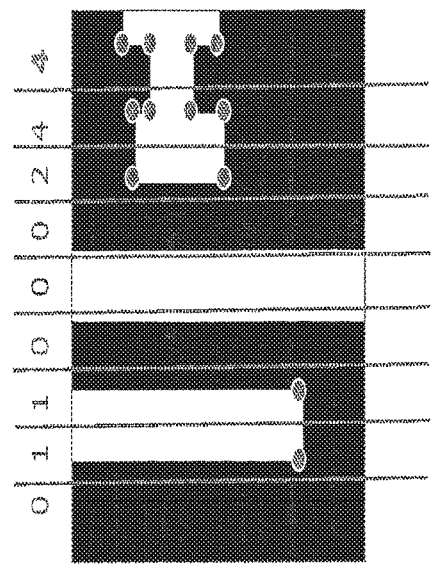
FIG. 5*b* illustrates an example of extracting maximal Y vertex count as a property.
Figure 5C:
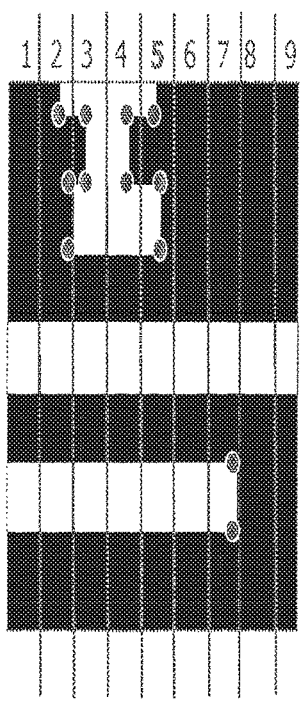
FIG. 5*c* illustrates an example of extracting maximal X vertex count location as a property.
Figure 5D:
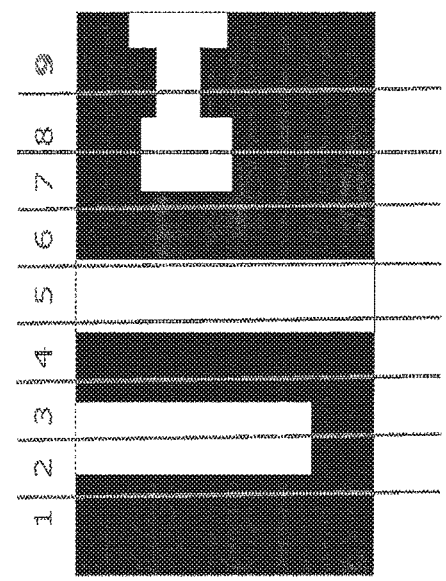
FIG. 5*d* illustrates an example of extracting maximal Y vertex count location as a property.
Figure 5E:
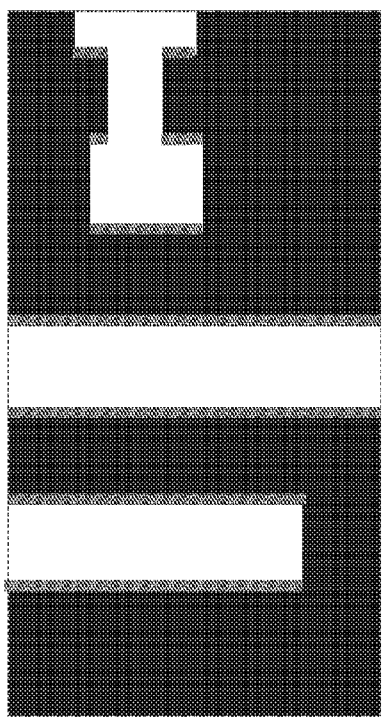
FIG. 5*e* illustrates an example of extracting X perimeter as a property.
Figure 5F:
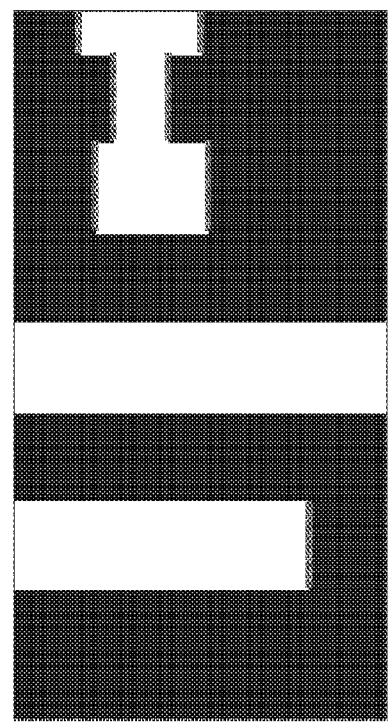
FIG. 5*f* illustrates an example of extracting Y perimeter as a property.

FIGS. 5a-5f illustrates examples of various properties extracted from the same region of interest. In FIG. 5a, the property is maximal X vertex count. At the top of the figure, the number of X vertexes is listed for each column. The maximal X vertex count is 3. In FIG. 5b, the property is maximal Y vertex count. At the left side of the figure, the number of Y vertexes is listed for each row. The maximal Y vertex count is 4. In FIG. 5c, the property is maximal X vertex count location. At the top of the figure, the column number is listed. The maximal X vertex count location is 5 because column 5 has the maximal X vertex count. In FIG. 5d, the property is maximal Y vertex count location. At the left of the figure, the row number is listed. The maximal Y vertex count location is 9 because row 9 has the maximal Y vertex count. In FIG. 5e, the property is X perimeter. The value of this property is derived by adding the lengths of horizontal edges within the region of interest. In FIG. 5f, the property is Y perimeter. The value of this property is derived by adding the lengths of vertical edges within the region of interest. FIG. 6 illustrates a table of nine properties for four regions of interest. The first six properties are illustrated in FIGS. 5a-5f.

Next, in operation 380, the root cause identification unit 270 analyzes diagnosis reports of failing devices fabricated according to the layout design based at least on the one or more properties to identify probable root causes. As discussed previously, many yield analysis tools determine probable root causes from root cause candidates by analyzing diagnosis reports. The root cause candidates can be generated based on available design-for-manufacture (DFM) rules or heuristics. The root cause identification unit 270 generates root cause candidates based on at least the extracted one or more properties and uses the generated root cause candidates to identify probable root causes. A single property value may be treated as a root cause candidate. In FIG. 6, for example, the maximal X vertex count can leads to three root cause candidates: maximal X vertex count of 2, maximal X vertex count of 3 and maximal X vertex count of 6. A range of property values may also be treated as a root cause. In the above example, a root cause candidate may be designated as having the maximal X vertex count below 3.

It should be noted that the properties discussed above are for illustration only. Various different properties can be extracted from regions of interest and different root cause candidates may be generated for yield analysis.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

What is claimed is:

1. A method comprising:
by using a computer:
receiving diagnosis reports generated by testing one or more devices comprising an integrated circuit fabricated according to a layout design;
determining regions of interest for points of interest, the points of interest representing locations of potential critical features in the layout design;
extracting one or more quantitative properties from the regions of interest;
identifying probable root causes for failing devices fabricated according to the layout design by analyzing diagnosis reports of the failing devices and the one or more quantitative properties; and
increasing a manufacturing yield of devices fabricated according to the layout design based on the identified probable root causes.

2. The method recited in claim 1, wherein the identifying comprises:
searching for disruptions of layout features.

3. The method recited in claim 1, wherein the regions of interest are determined based on a predetermined size.

4. The method recited in claim 1, wherein each of the regions of interest is associated with one of the points of interest.

5. The method recited in claim 1, wherein the analyzing comprises:
generating root cause candidates based on at least the extracted one or more quantitative property values; and
identifying probable root causes based on the generated root cause candidates.

6. The method of claim 1, further comprising:
determining that at least two points of interest are near each other within a predetermined distance; and
based on the determining, determining one region of the regions of interest for the at least two points of interest.

7. The method of claim 1, wherein the quantitative properties include at least one or more of the following: a vertex count or a sum of perimeter length.

8. The method of claim 1, converting the regions of interest to histograms and applying Fourier transforms.

9. One or more non-transitory computer-readable media storing computer-executable instructions for causing one or more processors to perform a method, the method comprising:
receiving diagnosis reports generated by testing one or more devices fabricated according to a layout design;
identifying points of interest representing locations of potential critical features in the layout design, the identified points of interest comprising line ends or corners in the layout design;
determining regions of interest surrounding the identified points of interest;
extracting pattern identifiers from the regions of interest;
using the pattern identifiers and the diagnosis reports, determining probable root causes of failing devices fabricated according to the layout design; and
using the probable root causes of failing devices fabricated according to the layout design, modifying the layout design to increase fabrication yields of the one or more devices fabricated according to the modified layout design.

10. The one or more non-transitory computer-readable media recited in claim 9, wherein the identifying the points of interest comprises:
searching for disruptions in layout features of the layout design.

11. The one or more non-transitory computer-readable media recited in claim 9, wherein the regions of interest are determined based on a predetermined size.

12. The one or more non-transitory computer-readable media recited in claim 9, wherein each of the regions of interest is associated with one of the points of interest.

13. The one or more non-transitory computer-readable media recited in claim 9, wherein the pattern identifiers are generated with a hash function.

14. The one or more non-transitory computer-readable media recited in claim 9, wherein the determining comprises:
generating root cause candidates based on at least the pattern identifiers; and
identifying probable root causes based on the generated root cause candidates.

15. The one or more non-transitory computer-readable media of claim 9, wherein the identifying probable root causes comprises using machine learning to identify commonalities based on the pattern identifiers.

16. A system comprising:
memory; and
one or more processing units coupled to the memory, the one or more processing units being programmed to execute instructions stored in the memory that cause the system to perform a method, the instructions comprising:
instructions for identifying points of interest in a layout design, points of interest representing locations of potential critical features;
instructions for determining regions of interest for the points of interest;
instructions for extracting one or more quantitative property values from the regions of interest;
instructions for receiving diagnosis reports generated by testing one or more devices comprising an integrated circuit fabricated according to the layout design;
instructions for analyzing diagnosis reports of failing devices fabricated according to the layout design based at least on the one or more quantitative property values to identify probable root causes; and
instructions for modifying the layout design to decrease failing devices fabricated according to the layout design based at least on the identified root causes.

17. The system recited in claim 16, wherein the identifying comprises:
searching for disruptions of layout features.

18. The system recited in claim 16, wherein the regions of interest are determined based on a predetermined size.

19. The system recited in claim 16, wherein each of the regions of interest is associated with one of the points of interest.

20. The system recited in claim 16, wherein the instructions for analyzing further comprise:
instructions for generating root cause candidates based on at least the extracted one or more quantitative property values; and instructions for identifying probable root causes based on the generated root cause candidates.

\* \* \* \* \*